Jan. 15, 1929.  
C. F. PENDLETON  
1,699,157  
FERTILIZER GRINDER  
Filed April 24, 1928  2 Sheets-Sheet 1
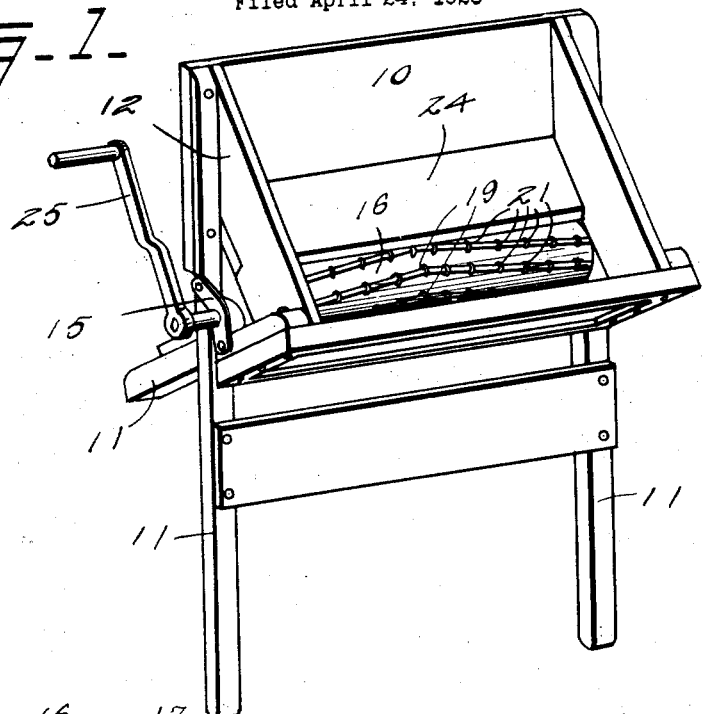
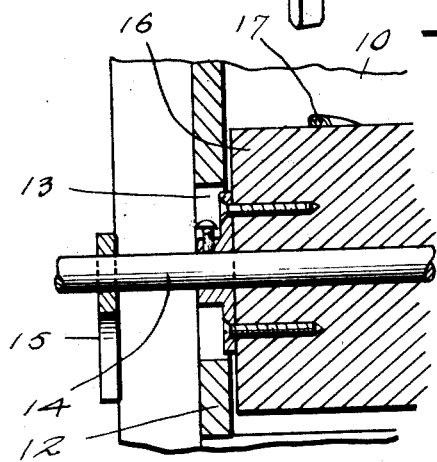
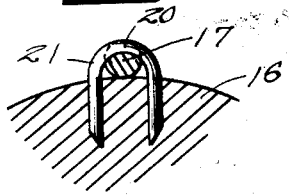
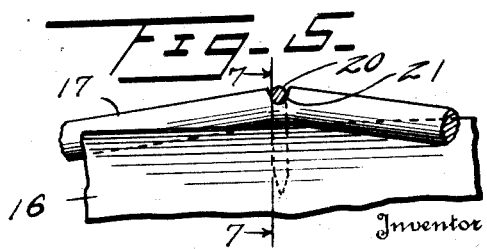
Inventor  
C. F. Pendleton  
By Watson E. Coleman  
Attorney Jan. 15, 1929.
C. F. PENDLETON
FERTILIZER GRINDER
Filed April 24, 1928
1,699,157
2 Sheets-Sheet 2
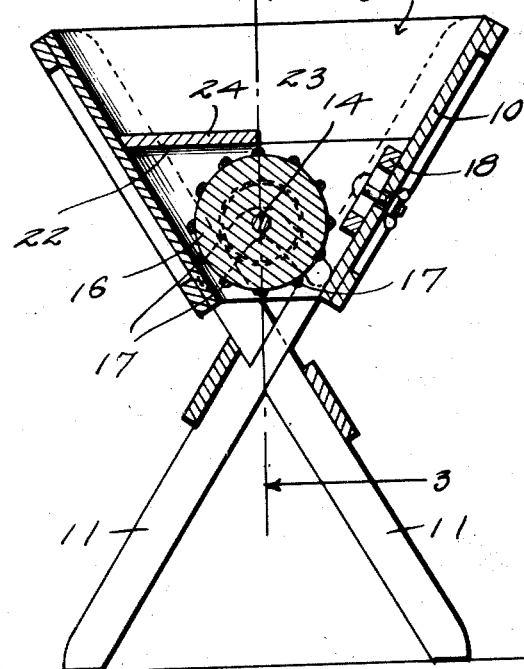
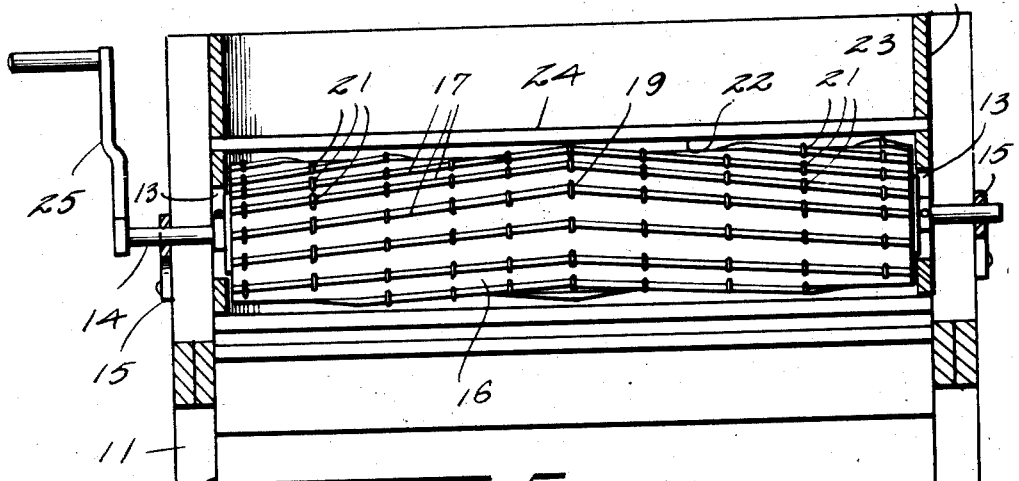
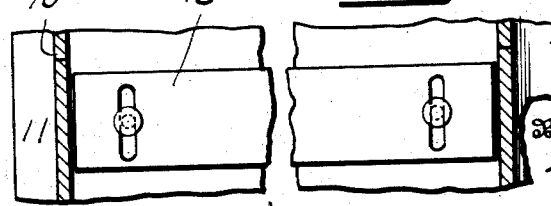
Inventor
C. F. Pendleton
By Watson E. Coleman
Attorney Patented Jan. 15, 1929.

1,699,157

UNITED STATES PATENT OFFICE.

CALEB FRANKLIN PENDLETON, OF CHERAW, SOUTH CAROLINA.

FERTILIZER GRINDER.

Application filed April 24, 1928. Serial No. 272,488.

This invention relates to fertilizer grinders and more particularly to a device for treating commercial fertilizers to reduce the same to the proper consistency for use upon the field.

Practically all commercial fertilizers are subject to lumping and in many instances, particularly with nitrates, phosphates and compositions thereof, the lumps are very hard and are extremely difficult to remove. The ordinary commercial reducers commonly employed for this purpose are inefficient, in that they are expensive and difficult to operate, due to the fact that excessive friction is produced in crushing the lumps which are reduced by a crushing rather than a cutting action. Accordingly, an important and primary object of this invention is the provision of a fertilizer grinder which reduces lumps formed in the fertilizer by a cutting or shearing action, as differentiated from the ordinary grinding or crushing action.

A further and more specific object of the invention is to provide a structure including fixed and movable grinding elements, of which the movable elements has blades or fins coacting with the stationary grinding element in such manner that an action similar to the action of a pair of shears is produced, thus slicing a portion from the lump as each blade or fin coacts with a stationary element.

A further object of the invention is the provision in a construction of this character of a structure such that the lumps of fertilizer are prevented from traveling longitudinally of the grinding elements and thus piling up at a certain point, so that this portion of the grinding element would be rapidly worn and destroyed.

A still further object of the invention is to provide a means accomplishing the funcion just recited which additionally serves as a means for securing the blades of the movable element of the grinder to the body thereof.

A still further object of the invention is to provide a hopper structure for devices of this character such that the load of the fertilizer is supported in such manner that it is not impinged directly upon the grinder and so does not have a tendency to cause excessive friction in the bearings of the movable element thereof.

A further object of the invention is to provide a novel hopper construction permitting the parts thereof to be readily assembled without the use of any tools other than those ordinarily forming a portion of the kit of a farmer.

These and other objects I attain by the construction shown in the accompanying drawings, wherein for the purpose of illustration is shown a preferred embodiment of my invention and wherein:—

Figure 1 is a perspective view of a fertilizer grinder constructed in accordance with my invention;

Figure 2 is a transverse sectional view therethrough;

Figure 3 is an enlarged sectional view on the line 3—3 of Figure 2;

Figure 4 is a fragmentary detail sectional view through one end of the rotary element of the grinder;

Figure 5 is an enlarged detail view partially broken away of one of the grinding elements;

Figure 6 is a detail view of the stationary grinding element;

Figure 7 is a section on the line 7—7 of Figure 5.

Referring now more particularly to the drawings, the grinder includes a hopper having downwardly converging side walls 10 connected to the upper ends of decussate leg elements 11. These leg elements are held in proper angular relation to one another and the ends of the hopper are closed by end walls 12 which are likewise secured to the upper ends of the leg members. The lower ends of the end walls have openings 13 for the passage of a shaft 14 mounted in bearings 15 connecting and forming a brace for the leg elements.

Upon this shaft within the hopper is secured a wooden roll 16 having fins or blades 17 upon the periphery thereof. Secured to one of the side walls 10 and adjustable thereon toward and away from the lower end of the hopper is a stationary blade 18. The blades 17 of the wooden roll 16 extend longitudinally of this roll and are obtusely bent at their centers, as indicated at 19. These blades are secured in position upon the periphery of the roll by staples 20 which engage the blades in notches 21 formed therein, so that the securing elements do not extend beyond the outer surfaces of the blades and accordingly the edges of the blades may be brought into close proximity to the coacting edge of the stationary blade 18. These securing elements, as will hereinafter appear, perform a further necessary function in the operation of the grinder.

In order to prevent the load of fertilizer placed in the hopper from being borne directly by the roll and its shaft, I provide a baffle or supporting shelf 22 extending outwardly from the inner face of the side wall 10 opposite that to which the stationary blade 18 is attached. The inner edge of this baffle terminates in approximate vertical alignment with the axis of the roll, so that the blades during the major portion of their non-cutting travel are out of contact therewith and the roll of the grinder is not frictionally resisted in its rotation beyond the necessary amount.

As a convenient means for installing this baffle, I form the ends 12 of two boards 23, one of which is notched, as at 24, so that when the boards are placed edge to edge, a space is provided to receive the end of the baffle. The outer end faces of the baffle, as more clearly shown in Figure 3, abut the inner edges of the legs, so that endwise displacement thereof is prevented. The shaft 14 is equipped at its outer end with an operating handle 25 and may, if so desired, be equipped with a drive pulley to enable connection thereof with power operating means, although this is found to be unnecessary and is, in most instances, impractical as the grinding must be carried on in the field where the fertilizer is actually to be distributed.

In the operation of the device, each blade 17 during rotation of the roll progressively cooperates with the adjacent edge of the stationary blade 18 from its ends to its middle, the coaction between the stationary blade and each individual blade being similar to that to two pairs of shears having a common blade and operating toward a common center. This shearing action removes from lumps lying between the stationary and movable elements of the grinder a thin layer as each blade passes. It will be obvious that this shearing action will have a tendency to force these lumps toward the center of the grinder and that unless this tendency is overcome, it will result in piling of the lumps at the central point of the grinder, so that the blades must perform the most difficult cutting action always at the same point. This, of course, would result in rapid destruction of the blades. This tendency is, however, prevented by the securing elements 20 which, as clearly shown in Figure 7, project to opposite sides of the blades, so that they serve to form stops spaced longitudinally of the blades and with which the lumps engage, so that their longitudinal travel is checked. This feature enables an even distribution of the wear, so that the device is relatively long-lived. Due to the fact that a shearing action is employed, the strain upon the working parts is materially reduced and the load which must be overcome in the operation of the grinder is made such that it is readily manually operable while, at the same time, giving a more rapid cutting action than any grinder for this apparatus with which I am familiar.

Since the construction employed may obviously be modified, I do not limit myself to the specific arrangement hereinbefore set forth except as hereinafter claimed.

I claim:—

1. In a grinder, a stationary blade, a rotating element adjacent the stationary blade and having blades angularly positioned upon the periphery thereof for coaction with the stationary blade whereby upon rotation of the rotatable element the stationary and movable blades have shearing coaction with one another, and means carried by the rotating element preventing travel of material, being acted upon by the rotating element, longitudinally of the blades.

2. In a grinder, a stationary blade, a rotating element adjacent the stationary blade and having blades angularly positioned upon the periphery thereof for coaction with the stationary blade whereby upon rotation of the rotatable element the stationary and movable blades have shearing coaction with one another, and means securing the blades of the rotatable element to the rotatable element engaging material acted upon by the blades to prevent longitudinal travel of the material therealong.

3. In a grinder, a stationary blade, a rotating element adjacent the stationary blade and having blades angularly positioned upon the periphery thereof for coaction with the stationary blade whereby upon rotation of the rotatable element the stationary and movable blades have shearing coaction with one another, securing elements straddling the blades of and engaged in the rotating element, the outer faces of the blades of the rotating element being notched to prevent projection of such securing elements beyond the outer surfaces thereof, said securing elements at the sides of the blades forming stops engaging material acted upon by the blades to prevent longitudinal travel of the material along the blades.

In testimony whereof I hereunto affix my signature.

CALEB FRANKLIN PENDLETON.